United States Patent [19]

Collins et al.

[11] Patent Number: 4,482,840
[45] Date of Patent: Nov. 13, 1984

[54] CRT CATHODE ASSEMBLY WITH SUPPORT MEANS

[75] Inventors: Floyd K. Collins, Seneca Falls; Donald L. Say, Waterloo, both of N.Y.

[73] Assignee: North American Philips Consumer Electronics Corp., New York, N.Y.

[21] Appl. No.: 424,118

[22] Filed: Sep. 27, 1982

[51] Int. Cl.³ .............................................. H01J 29/04
[52] U.S. Cl. ..................................... 313/446; 313/457
[58] Field of Search .............. 313/446, 457, 451, 417, 313/270

[56] References Cited

U.S. PATENT DOCUMENTS

| | | | |
|---|---|---|---|
| 3,351,792 | 11/1967 | Kuryla | 313/451 X |
| 3,973,162 | 8/1976 | Collins | 313/446 X |
| 4,101,801 | 7/1978 | Collins | 313/451 X |

*Primary Examiner*—Palmer Demeo
*Attorney, Agent, or Firm*—Thomas A. Briody; Jack Oisher; John C. Fox

[57] ABSTRACT

The invention relates to disc-like metallic means for supporting the cathode assembly in a miniaturized cathode ray tube single electron gun structure. Its substantially planar construction with radially extending supporting leg elements incorporates shapings which achieve both compactness and ruggedness. The beneficial strengthening effects are provided by the integration of a rim on the disc portion with U-shaped cross-sectional shapings of the leg elements.

6 Claims, 4 Drawing Figures

CRT CATHODE ASSEMBLY WITH SUPPORT MEANS

BACKGROUND OF THE INVENTION

This invention relates to cathode ray tube electron gun structures and more particularly to a discretely formed metallic member for supporting a cathode eyelet assembly in a single gun structure.

Single gun cathode ray tubes (CRTs) are manufactured for a variety of utilizations, as for example, monitor and computer graphic display terminals, monochrome television applications, and individual color projection tubes. Electron guns conventionally utilized therein are usually comprised of a plurality of sequentially cooperating electrode components held in spaced axial alignment by several longitudinal insulative rods or multiforms. Such integrated structures include an electron-emitting cathode structure positioned adjacent the first or control electrode or grid (G1). In such single gun tubes, the control electrode is often in the form of a cup-shaped component having an aperture in the closed end thereof. The cathode is located inside the cup with the terminal emissive surface of the cathode oriented adjacent the aperture of the control electrode. A common arrangement for effecting positioning of the cathode relative to the G1 aperture has been by crimping or otherwise forming annular protrusions in the cathode eyelet adjacent upper and lower surfaces of an apertured supporting ceramic disc. This assembly is then seated against a precisely-positioned spacing member placed on the inner wall of the control electrode, whereupon a metallic retaining member is abutted against the ceramic and suitably affixed to the inner wall of the electrode to hold the assembly in place. This procedure is expensive in that it involves a multiplicity of parts and the accurate assembly thereof. Additionally, the spacers must be matched with the cathode-ceramic assemblies to achieve the proper spacing between the cathode emissive surface and the aperture of the control electrode. Furthermore, it has been found that, upon successive operational heatings, the cathode eyelet tends to loosen in the ceramic. This often generates a microphonic condition and promotes an increase of cathode temperature, which may be in the order of 50° C. Both of these conditions are deleterious to tube operation and life.

In older multi-gun color CRT electron gun structures, each cathode assembly has been individually mounted using various support arrangements, such as that taught by Alan T. Kuryla in U.S. Pat. No. 3,351,792. However, in the present state of the art for single gun tube design, there is need for cathode support means which are suitable for single gun CRT constructions requiring strength, rigidity and durability, all in a miniaturized design.

SUMMARY OF THE INVENTION

It is a principal object of the invention to reduce and obviate the aforementioned disadvantages of cathode support means evidenced in the prior art. The invention pertains to means for spatially supporting the cathode assembly in a cathode ray tube single gun structure of a sequence of electrode components aligned and supported by a plurality of longitudinal insulative multiforms. The cathode assembly support means of the invention is oriented in spaced relationship with the control electrode component of the single gun structure. The support per se is formed as an annular disc-like metallic member having substantially planar upper and lower (alpha and beta) surfaces with a central opening formed therethrough. This opening is of a size to accommodate the positioning and attachment of a cathode positioning and supporting eyelet therein. The support member has a peripheral rim of substantially uniform height, preferably extending from the beta surface. Extending radially outward from the rim of this disc-like member are at least two spatially-related positioning leg elements of U-shaped cross-sectional configurations. The sides of these U-shaped elements are integral extensions of the aforementioned peripheral rim formation. As such, the apex of the exterior surface of each U-shaped element is in the plane of the surface of the support member opposite the rimmed surface. Thus, in preferred embodiment wherein the rim extends from the beta surface, the apices of the legs are in the plane of the alpha surface.

In another preferred embodiment, the peripheral rim is formed in a standing manner substantially normal to the beta surface of the disc-like member. In this case, the heights of the sides of the U-shaped leg elements are substantially uniform and preferably equal to the height of the rim.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Figure 1:
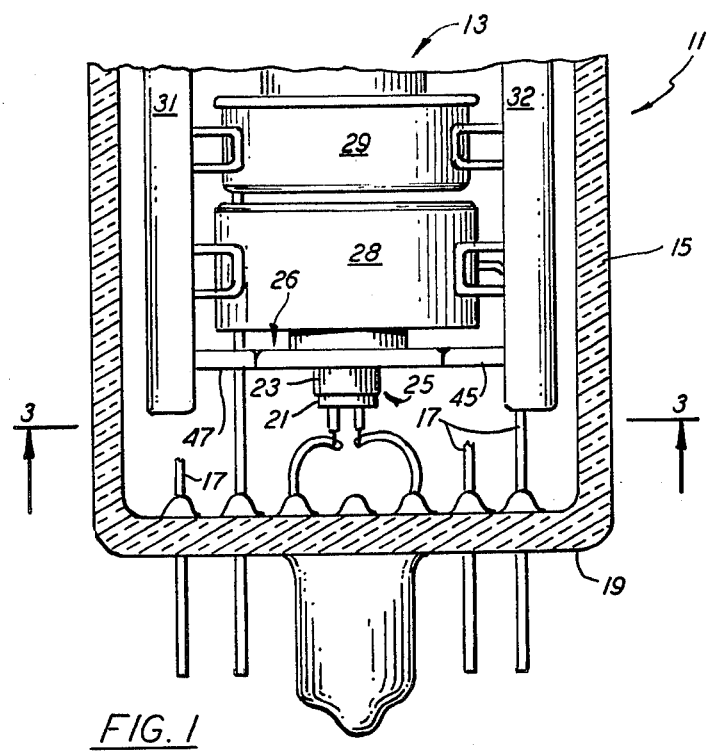
FIG. 1 is an elevational view, in partial cross-section, showing the rear portion of the gun structure in a single gun CRT wherein the invention resides.
Figure 3:
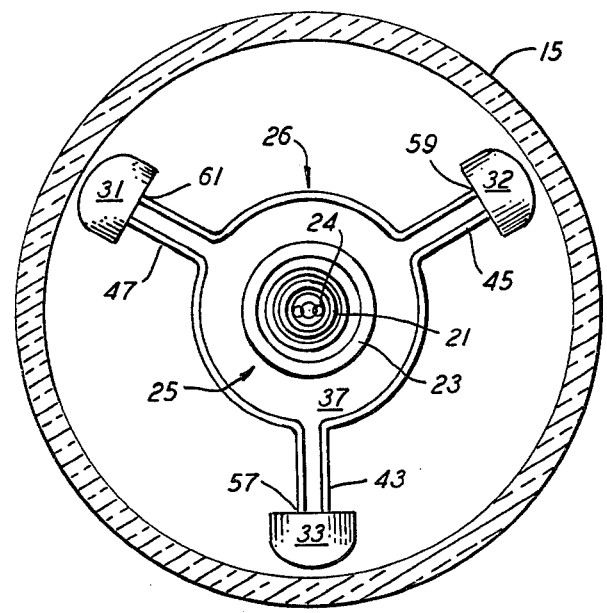
FIG. 3 is a sectional view of FIG. 1 taken along the plane 3—3 thereof.
Figure 4:
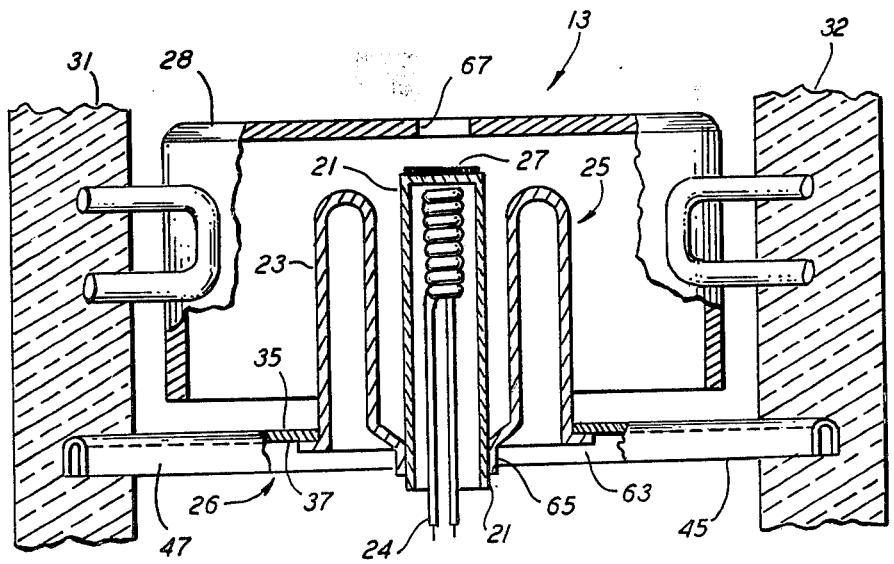
FIG. 4 is a cross-sectional elevation illustrating the relationship of the cathode support means to the single gun structure.

With reference to the drawings, there is shown in FIG. 1 the rear or terminal region of a single gun CRT 11, wherein the single electron gun structure 13 is spatially encompassed by the neck portion 15 and supported by an array of connective and supportive pins 17 traversing the tube closure portion 19. Only the rear section of the multi-electrode gun structure 13, wherein the invention is positioned, is depicted. Starting at the closure-oriented end of the gun structure, the initial components thereof are a cathode sleeve 21 and an associated cathode supporting and shielding eyelet 23, taken together these comprise the cathode eyelet assembly 25, one embodiment of which is further delineated in FIG. 4. This assembly is positioned by the support means 26, to be further described. Positioned within the cathode sleeve 21 is a heater element 24 which provides the elevated temperature necessary to promote electron emission from the terminally oriented electron emissive material 27. Forward of the cathode is the first or control electrode 28, which is spatially followed by the second electrode 29. Additional electrodes contained in the gun structure are not shown as they do not pertain to the environment of the invention. The several electrode components comprising the structure 13 are rigidly affixed to a plurality of longitudinal glass rods or multiforms by respective support lugs. In the embodiment shown and described, three spaced-apart multiforms 31, 32 and 33 are utilized as illustrated in FIGS. 1, 3 and 4.

Figure 2:
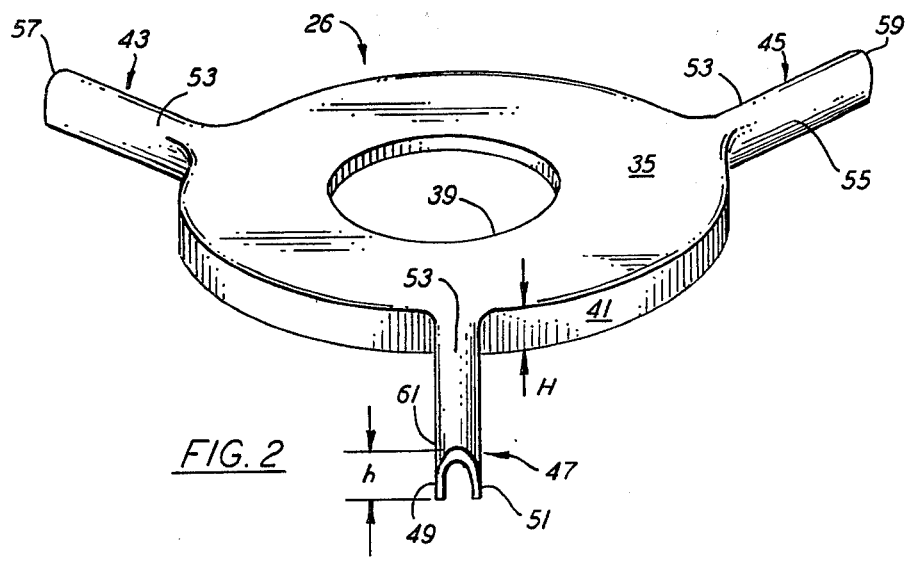
FIG. 2 is a perspective view delineating features of the cathode eyelet assembly support means.

With reference to FIG. 2, the cathode eyelet assembly support means 26 is shaped as a substantially annular disc-like member formed, for example, from 15 mil non-magnetic stainless steel. It evidences substantially planar alpha 35 and beta 37 opposed surfaces with a central opening 39 formed therethrough, such being dimensioned to accommodate the positioning and attachment of the cathode eyelet 23 therein. The support member 26 has a peripheral rim 41 of substantially uniform height "H", such being formed in a raised manner from the beta surface 37. In the embodiment shown, this rim is formed in a standing manner substantially normal to the beta surface.

Extending substantially radially, from discrete openings in the peripheral rim 41, are three integral positioning leg elements 43, 45, and 47 of like arched U-shaped cross-sectional configurations. Each of these U-shaped supporting elements is formed as an integral extension of the peripheral rim construction, and as such, the heights "H" of the sides 49 and 51 of each leg element are substantially uniform and substantially equal to the height "H" of the rim. In this relationship, the apex portion 53 of the exterior surface 55 of each U-shaped element is in the plane of the alpha surface 35 of the support member. As shown in FIG. 3, the terminal ends 57, 59, and 61 are embedded in the respective multiforms to provide rigid affixation for the support member 26. In addition to the strengthening structural advantages of the U-shaping of the leg elements, that particular cross-sectional shaping provides solid anchoring within the multiform supports.

The provision of the three supporting leg elements on the described embodiment of the cathode eyelet support means 26 is not to be considered limiting, as two, three, or four spatially-related legs can be provided for usage as necessitated in gun structures utilizing two, three, or four multiforms therein. In a two-multiform gun, for example, the positioning leg elements are preferably oriented in diametrical relationship.

With reference to FIG. 4, before the support means 26 is incorporated into the partially shown gun structure 13, the cathode shielding and supporting eyelet 23 is positioned within the central opening 39 with the ledge 63 of the eyelet seated on and affixed, as by welding, to the beta surface 37 of the support means. The exemplary eyelet shown is of dual-wall construction, such being disclosed in the aforementioned U.S. Pat. No. 3,351,792, but other eyelet constructions may be utilized. The support means 26, with the eyelet attached thereto, is positioned in a gun fabrication jig along with the associated electrode components, whereupon all are locked into placement by the application of the integrating heat-softened multiforms. As noted, the eyelet is thus positioned in a telescope manner within the cup-shaped first or control electrode component 28.

The cathode sleeve 21 is subsequently inserted into the eyelet through the neck aperture 65 and carefully adjusted to provide precise spacing between the cathode terminal emissive material 27 and the adjacent aperture 67 in the control electrode. When this desired spacing is achieved, as for example, by a conventional air pressure technique, the bottom of the cathode sleeve is bonded to the eyelet neck 65 to complete the cathode eyelet assembly.

As readily evidenced, the single gun cathode eyelet support means of the invention reduces microphonics and achieves marked efficiency over the prior art ceramic disc cathode support means. In addition, it provides cost reduction, simplification, compactness, and ruggedization not heretofore realized in miniaturized monochrome gun construction. Furthermore, this advantageous support means has versatility and may be incorporated into a variety of gun constructions, such as unipotential, bipotential, and tripotential structures.

While there have been shown and described what are at present considered the preferred embodiments of the invention, it will be obvious to those skilled in the art that various changes and modifications may be made therein without departing from the scope of the invention as defined in the appended claims.

We claim:

1. In a CRT single gun structure formed of sequentially arranged electrode elements integrated by a plurality of longitudinal support rods, a cathode assembly oriented in spatial relationship with the control electrode component of said gun structure, the cathode assembly including support means, a cathode eyelet and a cathode, said support means comprising:

a substantially annular disc-like metallic member having alpha and beta substantially planar surfaces with a central opening therethrough dimensioned to accommodate the positioning and attachment of said cathode eyelet therein, said member having a peripheral rim extending from one of said surfaces, said disc-like member having at least two integral positioning leg elements of U-shaped cross section extending substantially radially from said rim, said U-shaped elements having sides formed as extensions of said rim, the apex portion of the exterior surface of each U-shaped element being in the plane of the surface of said support member opposite the surface from which the rim extends.

2. The cathode assembly according to claim 1 wherein said peripheral rim is formed in a standing manner substantially normal to the beta surface of said disc-like member.

3. The cathode assembly according to claim 2 wherein the heights of the sides of said U-shaped leg elements are substantially uniform and substantially equal to the height of said rim.

4. The cathode assembly according to claim 1 wherein said disc-like member has two positioning leg elements oriented in diametrical relationship for incorporation into two insulating support rods of a gun assembly.

5. The cathode assembly according to claim 1 wherein said disc-like member has three positioning leg elements oriented in spaced apart relationship for incorporation into three insulating support rods of a gun assembly.

6. The cathode assembly according to claim 1 wherein said disc-like member has four positioning leg elements oriented in spaced apart relationship for incorporation into four insulating support rods of a gun assembly.

* * * * *